US012779531B2

(12) United States Patent
Schulte

(10) Patent No.: US 12,779,531 B2
(45) Date of Patent: Nov. 3, 2026

(54) METHOD FOR PROCESS DESIGN FOR A CASTING DEVICE AND METHOD FOR CONTROLLING A CASTING DEVICE

(71) Applicant: Martinrea Honsel Germany GmbH, Meschede (DE)

(72) Inventor: Boris Schulte, Meschede (DE)

(73) Assignee: Martinrea Honsel Germany GmbH, Meschede (DE)

( * ) Notice: Subject to any disclaimer, the term of this patent is extended or adjusted under 35 U.S.C. 154(b) by 338 days.

(21) Appl. No.: 18/438,559

(22) Filed: Feb. 12, 2024

(65) Prior Publication Data

US 2024/0269738 A1 Aug. 15, 2024

(30) Foreign Application Priority Data

Feb. 14, 2023 (DE) ..................... 10 2023 103 582.7

(51) Int. Cl.
*G05B 13/04* (2006.01)
*B22D 46/00* (2006.01)

(52) U.S. Cl.
CPC ........... *B22D 46/00* (2013.01); *G05B 13/042* (2013.01)

(58) Field of Classification Search
None
See application file for complete search history.

(56) References Cited

U.S. PATENT DOCUMENTS

| | | | | |
|---|---|---|---|---|
| 2018/0203431 | A1* | 7/2018 | Stoehr .................. | G05B 19/406 |
| 2021/0001399 | A1* | 1/2021 | Bullied .................. | B22D 46/00 |
| 2022/0137608 | A1 | 5/2022 | Ilin et al. | |
| 2023/0316380 | A1* | 10/2023 | Vasavada ............... | G05B 17/02 705/26.7 |

FOREIGN PATENT DOCUMENTS

| | | | |
|---|---|---|---|
| AT | 519005 | B | 3/2018 |
| DE | 102009059071 | A1 | 6/2011 |
| DE | 102020213813 | A1 | 5/2022 |

OTHER PUBLICATIONS

Krimpenis, A., P. G. Benardos, G-C. Vosniakos, and A. Koukouvitaki. "Simulation-based selection of optimum pressure die-casting process parameters using neural nets and genetic algorithms." The International Journal of Advanced Manufacturing Technology 27 (2006): 509-517.
Villarreal, Maria G., Rachmat Mulyana, José M. Castro, and Mauricio Cabrera-Ríos. "Simulation optimization applied to injection molding." In 2008 Winter Simulation Conference, pp. 1995-2003. IEEE, 2008.
Vosniakos, G-C., V. Galiotou, D. Pantelis, P. Benardos, and P. Pavlou. "The scope of artificial neural network metamodels for precision casting process planning." Robotics and Computer-Integrated Manufacturing 25, No. 6 (2009): 909-916.

* cited by examiner

*Primary Examiner* — George Chen
(74) *Attorney, Agent, or Firm* — Smartpat PLC

(57) ABSTRACT

A method for quickly finding robust operating points of a casting process is disclosed. Metamodels and extrapolatable models contribute to reducing the experimental effort both in simulation and for practical experiments, and these models are subsequently used for autonomous control of the casting process.

24 Claims, 3 Drawing Sheets

METHOD FOR PROCESS DESIGN FOR A CASTING DEVICE AND METHOD FOR CONTROLLING A CASTING DEVICE

CROSS-REFERENCE TO RELATED APPLICATION

This application claims the benefit of German Patent Application DE 10 2023 103 582.7, filed on Feb. 14, 2023, the content of which is incorporated by reference in its entirety.

BACKGROUND

The present disclosure relates to a method for process design for a casting device and a method for controlling a casting device.

The quality of a cast component or casting component depends on a large number of parameters, such as the melt temperature, mold temperature, pressure curve, pressure holding time, cooling and setting time, to name but a few. It is therefore a particular challenge to find the parameters for controlling the casting device for a specific component with its individual component geometry that are the cause of defects or flaws on the component.

When manufacturing a new component for the first time, process parameters must therefore be determined that enable reliable series production of the component in question. In practice, employees often rely on their experience and vary the parameters according to the "trial and error" principle in order to achieve a stable process. This procedure can lead to success quickly or take a very long time, as it depends very much on the individual skills of the employees and also on strokes of luck or chance. The initial start of series production of a new component is therefore time-consuming and cost-intensive and difficult to plan.

In order to reduce the number of incorrectly produced cast components and to simplify the identification of sensible process parameters, computer-aided simulations are carried out that virtually reproduce the casting process for an individual component. These are usually casting process simulations that aim to reproduce the physical processes of the real casting process as accurately as possible with computer support.

For example, one hundred different parameter sets are analyzed and evaluated. A parameter set forms a test point, wherein the successive production of five components is simulated for each test point, for example. Five shots are therefore virtually run for each test point. A "shot" refers in a familiar way to the production of a cast component by pouring molten metal into a casting mold.

The type of test plan, the number of test points and the number of shots to be simulated per component are specified by the user. Such a series of tests, which involves the simulation of a total of five hundred cast components, requires enormous computing capacity and takes several days or weeks, even with very powerful computers. Even with the aid of modern simulation software, the initial start-up of series production is therefore still time-consuming and cost-intensive.

The quality of the virtually produced components can also be analyzed by computer. The last simulated component is usually analyzed for each test point, as this component is assumed to have reached a steady state for the temperature of the virtual casting mold. For the aforementioned procedure, the fifth component of each test point would therefore be analyzed. The quality of the virtual components is then used to determine the parameters that could be useful for initial practical trials.

The procedure described above has the disadvantage that the assumption that the steady state of the mold temperature is reached for the fifth shot of each test point does not always apply. This is because the number of repetitions for each test point is determined by the user—again on the basis of empirical values. For example, it may be the case that for some of the test points the steady state is reached after just three shots, while for other test points seven shots are required to reach the steady state.

The results of the series of tests described above may therefore be affected by the fact that certain parameter sets of individual test points are rejected as unsuitable because the evaluation of a component was carried out before the steady state was reached. However, it is possible that this test point in particular may deliver excellent results once the steady state has been reached.

Conversely, it may be the case that test points are classified as suitable even though the evaluation of a component of this test point was carried out before the steady state was reached. It is therefore possible that this test point provides unusable results when the steady state is reached.

This uncertainty means that in operational practice, the number of shots per test point is increased by an operator from the outset or estimated to the safe side in order to achieve the steady state for each of the test points in every case. For the component described above, for example, the number of shots per component is increased from five to seven or ten, wherein the simulation series now comprises seven hundred or one thousand individual simulations for the casting production of a respective component instead of five hundred. The computing time increases accordingly. Depending on the selected test plan, the test points may have to be recalculated with the changed boundary conditions or the assumed number of cycles.

However, even this procedure of increasing the number of shots per test point does not exclude the possibility that the steady state is still not reached for a few test points, while on the other hand too many shots are simulated for the majority of the test points, as the steady state is already reached earlier.

Furthermore, the sole evaluation of the last simulated shot of a respective test point has the disadvantage that no quality statements on the components during the heating of the mold up to the steady state are determined by means of the simulation. However, such data could be useful for the start-up of a process or the cold start in order to produce good parts more quickly.

For certain component geometries, it may also occur that the specified number of user-defined test points is not sufficient to determine suitable process parameters or that the number of test points is far too high.

The procedure described above of predefining and processing the entire test plan or the entire series of tests also has the disadvantage that the software does not use the results of previous simulations of other components. If, for example, it has been determined in a previous test that a certain melt temperature or mold temperature is too low for the production of a particular component, further test points with even lower melt temperatures or mold temperatures are still calculated in order to complete the test plan. Each test point and each component of the test plan is therefore completely recalculated or simulated—using the aforementioned high computing power and computing time and regardless of whether the test point is relevant to practice or not.

The selection of process parameters based on the simulation series described above also has the disadvantage that statements on the robustness or stability of a particular test point can only be made with enormous computational effort and/or testing. For example, it may occur that a test point that initially delivers good component qualities in the simulation and in practice is very sensitive to any minor parameter fluctuation. This can lead to considerable quality problems in series production if the specified parameters are not adhered to exactly at all times.

SUMMARY

The present disclosure provides an improved method for process design for a casting device and an improved method for controlling a casting device, which in particular enable more efficient determination and control of stable process parameters for a cast component.

The present disclosure is based on the idea of supplementing the known casting process simulation and/or practical experiments with models for more efficient test planning and process analysis in order to accelerate the identification of robust process parameters and enable stable control of a casting process.

A method for process design for a casting device is provided, comprising the following method steps: carrying out a test point calculation, wherein process parameters of a casting process for a casting component are assigned to a respective test point, wherein a number of process parameters define an n-dimensional test space and wherein the test points are calculated sequentially filling the test space within the test space and are transferred to a casting process simulation; carrying out the casting process simulation, wherein the production of the casting component is simulated sequentially for the test points transferred from the test point calculation using the process parameters assigned to the respective test point, wherein the sequential production of two or more casting components is simulated for each test point in a virtual mold until the temperature of the virtual mold has reached a steady state, wherein an output parameter or a plurality of output parameters is evaluated for each casting component of a test point; carrying out an optimization, wherein at least one metamodel of the casting process simulation is created for at least part of the n-dimensional test space using the process parameters and the assigned output parameters, wherein a robust, steady optimum with its assigned process parameters is determined for one of the output parameters or for a plurality of the output parameters; carrying out a casting process, wherein at least one casting component is produced by means of a casting device, wherein the process parameters assigned to the robust, steady optimum are used as process parameters of the casting device and wherein an evaluation of one output parameter or a plurality of output parameters for the casting component is carried out.

The approach initially has the advantage that far fewer casting process simulations are required to find robust process parameters compared to the simulation strategy described at the beginning. For example, the number of shots required for each test point, i.e. the number of component productions to be successively simulated for each test point, is reduced by introducing a termination criterion in the form of reaching the steady-state temperature for the virtual mold. In this way, it is possible to prevent further shots being simulated for a particular test point, but no changes to the initial parameters occur because the steady state has already been reached. In this way, energy, computing time and storage capacity can be saved.

A significant difference to the procedure described at the beginning is that an output parameter or a plurality of output parameters are evaluated for each casting component of a test point. In other words, each shot of a test point is evaluated, wherein the runs for the respective test point are also terminated when the steady state is reached. In this way, relevant data for the behavior of the casting device, for example during a cold start or before reaching a steady state, is collected on the one hand and the next test points are simulated more quickly on the other.

The termination criterion can therefore prevent too few or too many repetitions being simulated for a test point compared to a predefined test plan with a predefined number of shots per test point. Furthermore, it can be avoided that simulation results are classified as good for which a steady state has not been reached or that simulation results are discarded although no steady state has been reached.

The disclosed method also has the advantage that by providing at least one metamodel, interpolation effects can be used and optimum process parameters can be found more quickly.

Furthermore, the at least one metamodel can be used to perform a quick root cause analysis in order to evaluate the relationship between a process parameter and a component defect.

When speaking of an n-dimensional test space, the “n” dimensions of this test space are defined in particular by the fact that the number of process parameters corresponds to a natural number $n \geq 2$.

The terms “casting component” and “cast component” are used synonymously in this text. The terms “casting process” and “cast process” are used synonymously in this text. Two or more metamodels can be used for the optimization. In particular, the optimization can be a multi-objective optimization, wherein the optimum process parameters are determined for two or more initial parameters to be taken into account.

Overall, the procedure can significantly reduce the required computing time and also the electrical energy required for simulation, as well as the costs, in order to arrive at meaningful process parameters more quickly, which can then be verified in real tests.

Carrying Out the Test Point Calculation

The test point calculation serves in particular to cover the specified test space as quickly as possible and also to arrive at a validated metamodel or a plurality of validated metamodels as quickly as possible. Therefore, only as many casting process simulations are carried out as are required to provide a metamodel or a plurality of metamodels, wherein the optimization, in particular a multi-objective optimization, can be carried out on the basis of the metamodel or metamodels.

Furthermore, the test point calculation serves in particular to exclude test points that do not make sense and to avoid a casting process simulation for test points that are not practical or cannot be run. Input and output constraints, which together define the actual boundaries of the test area under consideration, are therefore taken into account as part of the test point calculation.

In particular, the test point calculation is not only used to cover the specified test space for the first time, but can also be used to determine test points when checking the robustness of a steady optimum.

Furthermore, the test point calculation can be used to determine test points when performing the practical trials of the casting process. The test point calculation can also be used when performing the practical tests to check compliance with input constraints and output constraints.

The test point calculation can be an independent software module that has an interface to the casting process simulation or to a programmable logic controller of the casting device. Alternatively, the test point calculation can be an integral part of the casting process simulation.

It may be provided that the test space is limited by at least one previously known input constraint or by a plurality of previously known input constraints, in particular one or more physical previously known input constraints and/or one or more machine-specific known input constraints and/or one or more component-specific previously known input constraints.

Input constraints are, in particular, all known boundaries that define the theoretical test space in advance, i.e. the minimum and maximum boundaries of the test space. For the example of the melt temperature, the following applies: The minimum boundary is defined by the solidus temperature of the alloy. The maximum boundary is defined by the maximum heating power in the existing machine configuration. It is therefore not advisable to carry out simulations below the solidus temperature or above the maximum achievable temperature, as these cannot be simulated in practice.

The casting process simulation is not aware of physical, machine-specific or component-specific boundaries of the casting process to be simulated. For example, certain components of a casting device may have boundaries with regard to pressure resistance and/or temperature resistance, the non-observance of which could lead to damage to the components concerned. It is therefore not sensible to select process parameters in a range that would exceed the boundaries of the load-bearing capacity for the components in question. This is therefore an example of technical machine boundaries or input constraints. An example of a further technical machine boundary is, for example, a possible speed for heating the melt. The maximum heat input that can be achieved per unit of time is limited by the capacity of the relevant heating device of a casting device. It therefore does not make sense to simulate process parameters that assume faster heating of the melt.

An example of a physical boundary is the solidus temperature of the alloy in question, which is used to produce the casting component in question by means of the casting device. Thus, it does not make sense to simulate process parameters that provide for the removal of a casting component in question before the component in question has completely solidified. It can be seen that it is equally impractical to simulate melt temperatures that are below the solidus temperature.

One example that can be regarded as a machine-specific or component-specific boundary is the amount of melt that is introduced into a casting mold or the volume of the component. It does not make sense to simulate process parameters for which a mold cannot be completely filled, as it would simply not be possible to manufacture the component in question in this way.

Machine-related input constraints are, for example, the maximum flow rates of the cooling systems, the maximum heating capacities, the maximum pressure rise ramp or the fact that the start of cooling must be before the end of cooling.

The input constraints therefore limit the test space even before the first simulation of a first test point to that part of the test space that can be carried out in practice, taking into account physical and/or machine-specific and/or component-specific boundary conditions, so that test points are excluded that cannot be represented in practice or could lead to damage to the casting device.

It may be provided that the test space is limited by one or more output constraints, in particular one or more physical output constraints and/or one or more machine-specific output constraints and/or one or more component-specific output constraints, wherein the output constraints are determined on the basis of the output parameters of the casting process simulation and/or the casting process.

Output constraints are not known in advance, but only arise after the simulation of several test points. The output constraints also limit the test space to those test points that are relevant in practice. The boundaries of the test space with regard to the output constraints are unknown a priori.

An example of an output constraint is the nozzle length of a cast component. This is a section of the component that solidifies in the area of a nozzle for introducing molten material into the casting mold. If the nozzle length is too long for the component in question, the nozzle of the casting device may be damaged, making it irreparable or requiring time-consuming assembly work to remove solidified material. This can also result in damage to handling equipment and possibly cause a production stop.

Another example of an output constraint is an ejection temperature or a solidus temperature of a relevant component. If this is too high, the dimensional accuracy of the component in question can be impaired, even though the melt has already solidified. Furthermore, an excessively high ejection temperature can lead to damage to handling devices that are intended to remove the relevant casting component from the mold. Both the nozzle length and the ejection temperature are therefore parameters that can only be determined after the component in question has been simulated or manufactured.

Output constraints may still apply if the relevant process parameters would lead to a machine stop in practical operation.

It may be provided that an extrapolatable model is calculated for at least one output constraint, wherein compliance with the output constraint is checked for each test point before it is transferred to the casting process simulation by means of an extrapolation based on the extrapolatable model, wherein, in the event of compliance with the output constraint, the test point is transferred to the casting process simulation, wherein, in the event of non-compliance with the output constraint, the test point is discarded and a new test point is calculated within the test space and wherein this new test point is again checked for compliance with the output constraint.

It may be provided that the test point is discarded and a new test point is determined using the extrapolatable model on a boundary of the output constraint.

Alternatively, the test point can be shifted using the extrapolatable model while maintaining a safety distance from the boundary of the output constraint.

After the first test points within the test space have been calculated and evaluated, the extrapolatable model can be used to estimate or predict for subsequent test points whether they will comply with an assigned output constraint or are likely to violate the relevant output constraint.

For example, if there is a strong correlation between the melt temperature and the nozzle length, and if a critical nozzle length is almost reached for a comparatively low melt temperature that has already been simulated, it can be assumed that the critical nozzle length will be exceeded if the melt temperature is reduced further. The extrapolatable model is therefore a way of ensuring that the output constraints are already taken into account in the design of experiments before the simulation of the relevant test point is carried out. This avoids wasting valuable computing time on test points that are not suitable for practical use.

Several separate extrapolatable models can be calculated for critical output constraints. To stay with the example given above for an output constraint, for example, an extrapolatable model can be created for the relationship between the ejection temperature and a cooling time.

Several process parameters can be included in such an extrapolatable model as input variables. For example, in the aforementioned example, the cooling time and a melt temperature can serve as input variables, with the ejection temperature as the output variable.

It is understood that in such an extrapolatable model, a plurality of process parameters can be considered as input variables and a plurality of output constraints as output variables.

Overall, the specification of an extrapolatable model or several extrapolatable models for one or more output constraints serves to use the results of the casting process simulation as quickly as possible for efficient test point calculation in order to avoid the simulation of test points that are not relevant in practice.

In conjunction with the extrapolatable models, the output constraints also make it possible to estimate the boundaries of the practically relevant test space.

The extrapolatable model can be a linear regression. The extrapolatable model can be an AI model, such as a neural network or similar. Provided that a specified model quality is achieved, a prediction of compliance or non-compliance with the assigned output constraint or constraints can be made quickly in both cases.

As a starting point for the test point calculation, it can be useful to select a test point that is as safe as possible and for which there is a very high probability that neither an input constraint nor an output constraint will be violated.

For example, it may be provided that a robust test point of a similar component is specified as the first test point. In this case, the term "similar" means, for example, that the casting component to be produced for the first time has a comparable shape, comparable dimensions and/or comparable wall thicknesses to the previously known component and, in particular, that a comparable alloy is used.

Alternatively, a central test point within the test space can be selected as the first test point, the process parameters of which have a predefined minimum distance to the parameter boundaries of the process parameters, in particular a predefined minimum distance to previously known input constraints. Accordingly, a test point should be selected to start the simulation which should be as far away as possible from the process boundaries. Insofar as value ranges are specified for process parameters that span the test space, an average value between a minimum and a maximum of the relevant process parameter could be selected for a majority of these process parameters, for example, as the boundaries of the process parameters are usually estimated towards the expected boundaries of the process.

It may be provided that, starting from the first test point, test points are first defined within the test space that do not exceed a specified distance from the first test point until the extrapolatable model can be formed, which is recalculated based on a currently specified test point and the nearest neighbors in a test point-specific manner.

The test space is therefore preferably filled from the inside out until it is possible to approximate the experimental points to the boundaries of the test space using an extrapolatable model or several extrapolatable models that take into account both the input constraints and the output constraints.

According to a further embodiment of the method, it is provided that the test points are calculated sequentially filling the test space on the basis of a distance criterion within the test space, wherein the distance criterion defines a distance of the next test point to be calculated from one or more of the previous test points within the test space.

For example, it may be provided that the distance criterion maximizes a distance between the next test point to be calculated and one or more of the previous test points within the test space.

The distance criterion can be used, for example, to ensure that those areas of the test space are specifically covered with test points in which no or only a few test points are currently available.

The distance criterion can perform a test point calculation within the test space using one of the following principles, for example: maximin, minimax, maxmean, Audze-Eglais or similar.

Such a test point determined using the distance criterion can be checked for compliance with the output constraint using the extrapolatable model described above or using the extrapolatable models described above before the relevant test point is transferred to the casting process simulation. If an output constraint is violated, the test point is discarded and another test point is determined instead using the distance criterion. Each of the test points proposed after the discarded test point is again checked for compliance with the output constraint and only transferred to the casting process simulation as a test point once compliance with the output constraints has been established.

It may be provided that the test point is discarded and a new test point is determined using the extrapolatable model on a boundary of the output constraint.

Alternatively, it may be provided that the test point can be shifted by means of the extrapolatable model, wherein a safety distance to the boundary of the output constraint is maintained.

The combination of the distance criterion with an extrapolatable model for an output constraint or with several extrapolatable models for one or more output constraints therefore enables the test space to be filled quickly, taking into account process boundaries relevant to practice.

A decisive aspect here is the sequential execution of the determination of the test points and the sequential simulation of the test points.

This is because for each test point calculated using the test point calculation, the results of the casting process simulation already calculated for previous simulated test points are taken into account in order to improve the quality of the selection or calculation of the next test point. A test space that takes into account input and output constraints is therefore covered with fewer test points than would be possible with the classic test planning described above, which predefines and determines all test points before the first casting process simulation.

One or more process parameters can be specified for each test point, which are selected from: melting temperature, filling pressure or pressure curve, pressure holding time, filling time, auxiliary time, setting time, mold opening time, cooling parameters, on/off times. This list is not exhaustive, but is to be understood as exemplary and can be supplemented or reduced as required according to the parameters that can be set and/or measured on a casting device.

For successive test points, at least one of the process parameters is changed or several process parameters are changed.

Carrying Out the Casting Process Simulation

The casting process simulation is used to virtually simulate the real casting process. For this purpose, the physical conditions must be stored as accurately as possible within the casting process simulation, such as the dimensions, materials and shapes of the components of the virtual casting device, corresponding heat conduction and heat transfer coefficients, the flow, temperature and solidification behavior of the melt as well as the corresponding degrees of freedom in order to be able to reproduce the process parameters of the real casting process within the simulation. It is clear that such a casting process simulation requires high computing capacities.

The aim of casting process simulation is to predict the component quality for a corresponding test point and the machine behavior as accurately and realistically as possible.

An output parameter of the casting process simulation can be a casting defect of the casting component, such as a porosity, blowholes, bubbles, a cold run or the like or the above-mentioned critical outputs or output constraints, such as the complete filling of the mold or the like. Two or more quality features, such as the above-mentioned porosity or cold run, as well as blowholes or bubbles, can be determined as output parameters by means of the casting process simulation, in particular in predefined component areas.

An output parameter of the casting process simulation can be a machine parameter, such as a mold temperature of the virtual mold at a specified position or the like. For example, the casting process simulation can have a virtual thermocouple or a virtual temperature sensor that simulates the behavior of a real temperature sensor or a real thermocouple as accurately as possible. The casting process simulation can have several virtual thermocouples or virtual temperature sensors that simulate the behavior of real temperature sensors or real thermocouples as accurately as possible. Alternatively or additionally, a simulated temperature of a point on a surface of the virtual casting mold or several points on the surface of the virtual casting mold can be used.

Two or more machine parameters can be determined as output parameters of the casting process simulation, in particular those machine parameters that can also be determined on a real casting device by means of corresponding sensors or the machine control system.

As previously mentioned, reaching the steady state for a test point is an important boundary condition to enable reliable, repeatable, i.e. robust process control in a real process.

It may be provided that the steady state within the casting process simulation is considered to have been reached if a change in the temperature of the virtual mold for successive casting components falls below a predefined threshold value. For example, twice the standard deviation of a sensor noise can be used as a threshold value.

In particular, it may be provided that the steady state within the casting process simulation is considered to have been reached if a change in the mold temperature at the virtual thermocouples of the virtual casting mold or a change in the casting defects in the defined component areas for successive casting components falls below a predefined threshold value.

Carrying Out the Optimization

The optimization serves to determine a robust, steady test point as efficiently as possible, wherein the optimization is carried out on the basis of at least one metamodel, which is a model of the casting process simulation—in other words, a model of the model.

Such a metamodel is used in particular to transfer the interactions and complex multiple dependencies between the process parameters as input parameters and the output parameters, which relate for example to a component quality to be achieved, into a mathematical model so that the output parameters for specified input parameters can be predicted with a quality comparable to that of the casting process simulation.

If such a metamodel is supplemented by practical test data in the further course, the quality of the prediction of the initial parameters by the mathematical model can even be increased in comparison to pure casting process simulation.

The term robust, steady optimum means in particular that the steady state of a temperature of the mold is achieved, wherein there is also a low sensitivity to parameter fluctuations in the environment of the test point. In other words, the term "robust" therefore means "stable", so that a satisfactory component quality can still be achieved for minor fluctuations in one or more process parameters.

The term robust, steady optimum also means in particular that the steady state of one or more temperatures or the component defects of the casting mold is reached for the relevant test point, wherein there is also a low sensitivity to parameter fluctuations in the environment of the test point.

For example, a metamodel can be created for at least one casting defect, such as porosity, cold run or the like. If the optimization is aimed at minimizing the porosity of the casting component, the relevant metamodel can therefore be used to determine a test point for which the porosity and the scattering of the porosity or the porosity in the worst-case scenario with process parameter variations is minimal, wherein process parameters assigned to the test point can be specified.

Such an optimization can also be a multi-objective optimization, wherein both the porosity and the cold run for a casting component in question are to be minimized. In this case, the optimum with its assigned process parameters is a test point for which the lowest possible cold run and the lowest possible porosity are achieved while at the same time minimizing their scatter.

Alternatively or additionally, a dynamic metamodel can be created for at least one machine parameter, such as a mold temperature of the virtual mold at a specified position or the like. In particular, such a metamodel also depicts a dynamic of the casting process during heating of the casting mold through successive casting cycles, since all components are evaluated for each test point until the steady state is reached with respect to the output parameters. The data of the casting process simulation, on the basis of which the metamodel is determined, therefore also contain data on the dynamics of the casting process. These dynamic models can be used in particular as boundary conditions for detecting or predicting the steady state in the course of optimization.

The metamodel can be an AI model, such as a neural network or the like, wherein the AI model is trained and validated based on the process parameters of the test points and the output parameters of the casting process simulation.

The metamodel can be an AI model, such as a neural network or the like, in particular designed as a locally linear model network with only one hidden layer, wherein the AI model is trained and validated on the basis of the process parameters of the test points and the output parameters of the casting process simulation or the real casting tests.

Local linear models can therefore be used as AI models, which enable fast calculation.

In particular, the AI model can therefore be a neural network with a single hidden layer, wherein the hidden layer is in particular a dense layer.

Validating the AI model can comprise the following method steps: Determining a model quality of the AI model by comparing an output parameter of the casting process simulation for a validation test point with a prediction of the AI model for the output parameter of this validation test point, wherein the AI model is released if a specified model quality is achieved or the validation is repeated for one or more further test points if the specified model quality is not achieved, wherein the output parameters of the casting process simulation for the validation test point are used to train the AI model before the renewed validation.

It may be provided that a ratio of the number of training points (test points) to the number of validation test points is specified and is, for example, 80:20 or 70:30. The required number of validation test points increases accordingly with the number of training points.

Accordingly, a validation loop can be performed in the manner described above until the specified model quality is achieved. For example, it may be provided that the specified model quality for validation is achieved when a coefficient of determination is greater than 0.8, in particular greater than 0.9, in particular greater than 0.95.

Therefore, in particular, only as many casting process simulations are carried out until a relevant metamodel has reached a sufficient quality to enable optimization to determine a robust, steady optimum.

The number of test points required for the casting process simulation is component-specific and depends on the relevant input constraints and output constraints. The present procedure therefore ensures that a sufficient number of casting process simulations, but not too many casting process simulations, are carried out.

The test plan is generated dynamically depending on the results of the simulation of the test points.

As an alternative to the AI models described above, the metamodels can also be specified as polynomials or classification models.

It may be provided that the test point calculation is used to calculate test points in the vicinity of the robust, steady optimum and that these test points in the vicinity of the robust, steady optimum are evaluated using the metamodel.

A relevant metamodel can be used to predict how sensitive a relevant optimum is to parameter fluctuations in the vicinity of the process parameters of a found optimum. If, for example, a very low porosity is predicted for a certain melt temperature using the relevant metamodel, the melt temperature can be varied by a few degrees with otherwise constant process parameters in order to predict, using the metamodel, whether the porosity will increase significantly as a result of this variation, the optimum found would therefore be unstable and not robust, or whether there is still low porosity in the vicinity of the optimum in question even if the temperature fluctuations in question are specified in the process parameters, and the optimum found is therefore stable or robust.

The variations of the parameters are therefore used to check whether a steady optimum in question is actually a robust, steady optimum or not. If several steady optima can be found in the course of an optimization or a multi-objective optimization, the steady optimum that has the lowest sensitivity to parameter variations and the greatest distance to the test space boundaries can be selected and is therefore the most robust of the steady optima determined.

According to one embodiment of the method, it may be provided that the robust, steady optimum is validated by means of the casting process simulation before the casting process is carried out and, in particular, test points in the vicinity of the robust, steady optimum are validated by means of the casting process simulation.

It may be provided that the optimization is a robust multi-objective optimization.

Carrying Out the Casting Process

The aim of the method steps described above is to minimize the number of real tests that need to be carried out with the casting device. The test point calculation, the casting process simulation and the optimization therefore serve to find the best possible starting point for practical tests and to avoid running test points with poor prospects of success due to a lack of process knowledge.

The casting process is also used in particular to validate and/or improve the extrapolatable models and metamodels described above. This is because the test results of the practical tests can be used to confirm the results of the extrapolatable models and the metamodels, to improve the extrapolatable models and the metamodels and to recalculate the extrapolatable models and the metamodels.

According to one embodiment of the method, it may be provided that, starting from a possible robust, steady optimum, further test points are run using the casting process, in particular test points in the vicinity of the possible robust, steady optimum, in order to confirm the possible robust, steady optimum as the robust, steady optimum. As already described above for the casting process simulation, a parameter variation in the vicinity of the relevant optimum serves to check the robustness of the relevant steady optimum.

The robustness test can be evaluated by analyzing the scatter of the output parameters or a worst-case scenario.

It may be provided that the order of the test points is sorted starting from the robust, steady optimum with increasing distance in the test space and/or sorted against the background of energy and/or time efficiency.

According to one embodiment of the method, it may be provided that sensor data from sensors of the casting device are used to validate and/or improve and/or recreate the metamodel or metamodels. For example, in the event that the metamodel in question is an AI model, a coefficient of determination of the AI model can be improved compared to the real test results. In particular, a coefficient of determination of over 0.9 can be achieved, especially over 0.95. In this case, it is a hybrid AI model that is trained and validated on the basis of both simulated data and practically determined data.

It may be provided that sensor data from sensors of the casting device are used to validate and/or improve and/or recreate at least one extrapolatable model. The aspects described above for the metamodel also apply equally to a relevant extrapolatable model. Here too, the coefficient of determination can be improved by incorporating real test results and sensor data.

The test point calculation can also be used when determining test points for the practical casting process in order to determine new test points and to check compliance with output constraints.

The casting process can be a low-pressure casting process, especially for molten metal.

The casting process can be a method for aluminum low-pressure casting.

The casting process can be a casting process with a reusable or lost mold.

The casting process can be a method for gravity casting, especially for molten metal.

Thermocouples can be used for temperature measurement and/or thermographic images can be recorded.

A further method for process design for a casting device is disclosed, comprising the following method steps: carrying out a test point calculation, wherein process parameters of a casting process for a casting component are assigned to a respective test point, wherein a number of process parameters define an n-dimensional test space and wherein the test points are calculated sequentially filling the test space within the test space and transferred to a casting process, carrying out the casting process, wherein the production of the casting component is carried out sequentially for the test points transferred from the test point calculation using the process parameters assigned to the respective test point, wherein the sequential production of two or more casting components is carried out for each test point in a mold of the casting device until the temperature of the mold has reached a steady state, wherein an output parameter or a plurality of output parameters are evaluated for each casting component of a test point; carrying out an optimization, wherein at least one metamodel of the casting process is created for at least part of the n-dimensional test space using the process parameters and the assigned output parameters, wherein a robust, steady optimum with its assigned process parameters is determined for one of the output parameters or for a plurality of the output parameters; further carrying out the casting process, wherein at least one casting component is produced by means of a casting device, wherein the process parameters assigned to the robust, steady optimum are used as process parameters of the casting device and wherein an evaluation of one output parameter or a plurality of output parameters for the casting component is carried out.

This further method differs from the embodiment described above in that instead of simulation, real, practical tests are used to collect data for the metamodel and to create the metamodel on the basis of this data. All the aspects described above for calculating test points and optimization can therefore also be applied to this variant of the method.

Furthermore, a method can be specified which follows a hybrid approach, wherein test points for obtaining data for the metamodel are run both by means of the simulation and by means of practical tests.

A further method for process design for a casting device is therefore provided, comprising the method steps: carrying out a test point calculation, wherein process parameters of a casting process for a casting component are assigned to a respective test point, wherein a number of process parameters define an n-dimensional test space and wherein the test points are calculated sequentially filling the test space within the test space and are transferred to a simulated casting process and/or a practical casting process, carrying out the simulated casting process and/or the casting process, wherein the production of the casting component is simulated and/or carried out sequentially for the test points transferred by the test point calculation using the process parameters assigned to the respective test point, wherein the sequential production of two or more casting components is carried out for each test point in a virtual casting mold of the casting device and/or in a casting mold of the casting device until the temperature of the virtual casting mold and/or the casting mold has reached a steady state, wherein an output parameter or a plurality of output parameters are evaluated for each casting component of a test point; carrying out an optimization, wherein at least one metamodel is created for at least part of the n-dimensional test space using the process parameters and the assigned output parameters, wherein a robust, steady optimum with its assigned process parameters is determined for one of the output parameters or for a plurality of the output parameters; further carrying out the casting process, wherein at least one casting component is produced by means of a casting device, wherein the process parameters assigned to the robust, steady optimum are used as process parameters of the casting device and wherein an evaluation of one output parameter or a plurality of output parameters for the casting component is carried out.

Regulating the Casting Device

The disclosure also relates to a method for regulating a casting device, comprising the following method steps: Providing a metamodel according to the disclosure; regulation of process parameters of the casting device in the area of the robust, steady optimum.

Based on the evaluation of all cycles of a relevant test point, the dynamic behavior of a casting mold can be mapped from the cold state using the metamodel or metamodels. The metamodel can therefore be used to specify process parameters that enable good parts to be produced more quickly after a cold start of the machine and the steady state to be reached. The cyclical temperature curve of a casting mold essentially corresponds to a PT1 behavior. This behavior can be mapped using a metamodel, as the corresponding data has been determined using the casting process simulation and, in particular, on the basis of practical tests and forms the data basis of the metamodel.

The metamodel or metamodels can be continuously adapted using further data, which may also result in an adaptation of the robust optimum and/or the model-based regulation.

BRIEF DESCRIPTION OF THE DRAWINGS

The invention is described in more detail below with reference to drawings illustrating exemplary embodiments.

DETAILED DESCRIPTION

Figure 1A:
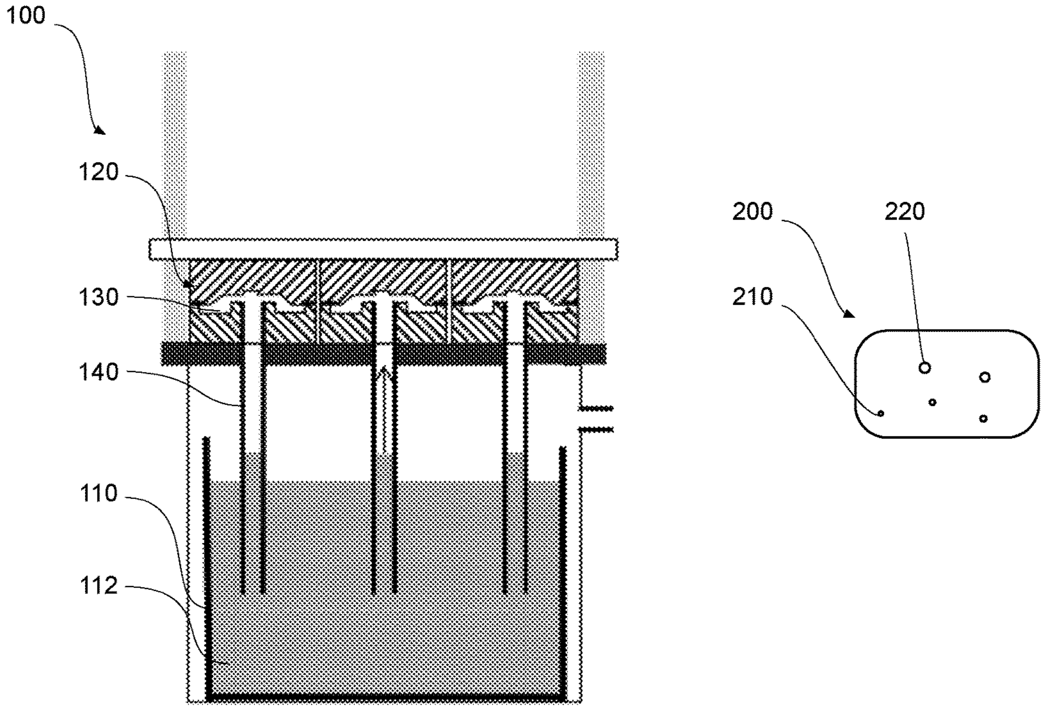
FIG. 1A shows a casting device with a cast component.

FIG. 1A shows a casting device 100. The casting device 100 is intended for the production of cast aluminum components 200.

The casting device 100 has a melting crucible 110 in which molten aluminum 112 is stored. The casting device 100 has a casting mold 120 with mold cavities 130, wherein the molten aluminum 112 can be introduced into the mold cavities 130 via pipelines 140.

A cast aluminum component 200 produced using the casting device 100 has casting defects, i.e. pores 210 or defects 220. The number and characteristics of a porosity and the defect in a component determine the component quality.

If the cast aluminum component 200 is a new component for which stable process parameters for operating the casting device 100 are not yet known, there are two challenges in particular. On the one hand, a stable process should be set up as quickly as possible and with little effort, which enables reliable production of the cast aluminum component 200 in the specified quality. Secondly, the process parameters that are primarily responsible for the occurrence of defects or imperfections on the component are to be determined.

Figure 1B:
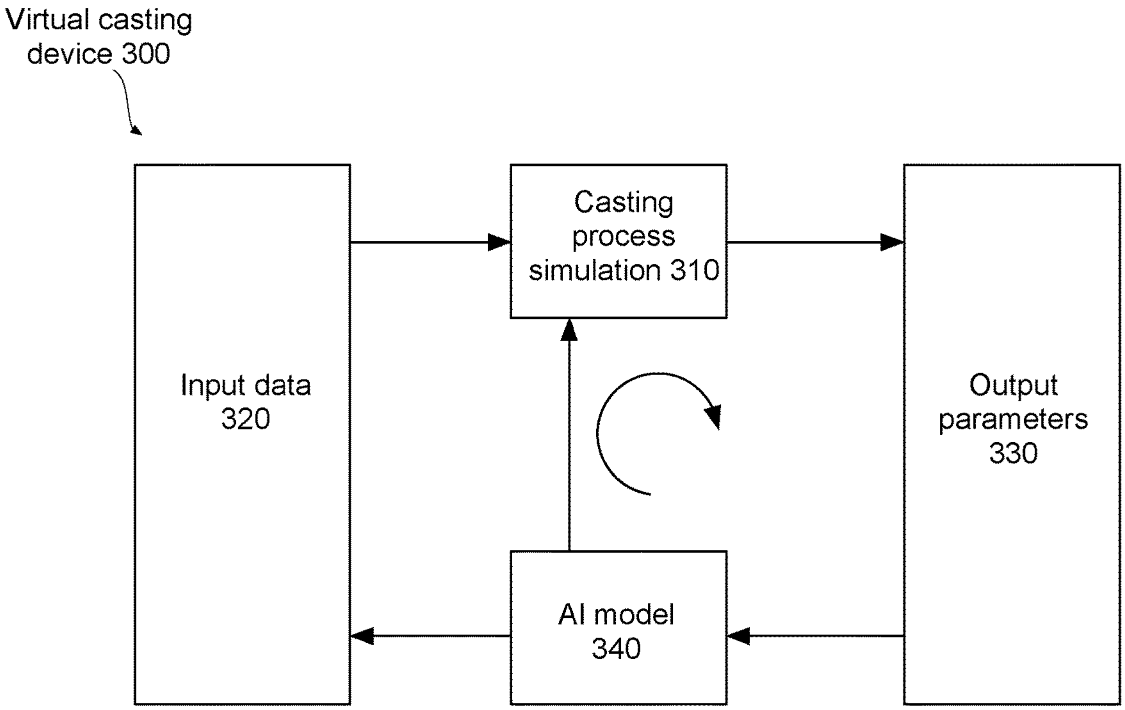
FIG. 1B shows a virtual casting device.

In order to reduce the number of real tests required to find stable process parameters, a virtual casting device 300 is used to simulate the casting process (FIG. 1B).

For this purpose, a casting process simulation 310 is supplied with input data 320 in order to simulate test points with specified process parameters. The input data includes, for example, a melt temperature, a pressure curve, a pressure holding time, a solidification, a mold opening time, cooling parameters and the like. A parameter set of a test point therefore comprises specified values for this input data, wherein virtual components are produced sequentially for a specified test point until a temperature of the casting mold or several temperatures of the casting mold, depending on the number of virtual or real thermocouples, has reached a steady state.

Output parameters 330 are determined for each virtually manufactured component, such as component defects or porosity or mold temperatures using virtual temperature sensors, as well as critical output variables for the safe operation of the system.

The data from the casting process simulation 310 is used to train a metamodel in the form of an AI model 340.

As soon as the AI model 340 reflects the results of the casting process simulation 310 in a sufficiently accurate manner, i.e. the training of the AI model 340 has been completed and the AI model 340 has been validated, process parameters for a steady state of the mold temperature can be determined with the aid of a multi-objective optimization, which ensure stable process control on the one hand and sufficient component quality on the other—initially viewed purely virtually using the casting process simulation 310 and using the AI model 340. These process parameters therefore belong to a test point that can be described as a robust, steady optimum.

This virtually determined optimum is the basis for the first real casting test using the casting device 100. During the real casting test, temperature sensors are used to measure the temperature of the melt and the casting mold at various positions. These measured values and a real determined component quality are in turn used to further improve the AI model 340, i.e. to train and validate or recalculate it.

The provision of the AI model 340 is explained in more detail below with reference to FIGS. 2 and 3. Decisive for the quality of the AI model 340 and for the efficiency during the creation of the AI model is in particular the selection of the first test points or the first test point as well as the specification of the partially known test space.

The test space is multidimensional in this case, as a wide range of values is possible for all the input data mentioned above and each individual value of a relevant parameter can theoretically be combined with all conceivable combinations and variations of all individual values of all other parameters.

Figure 2:
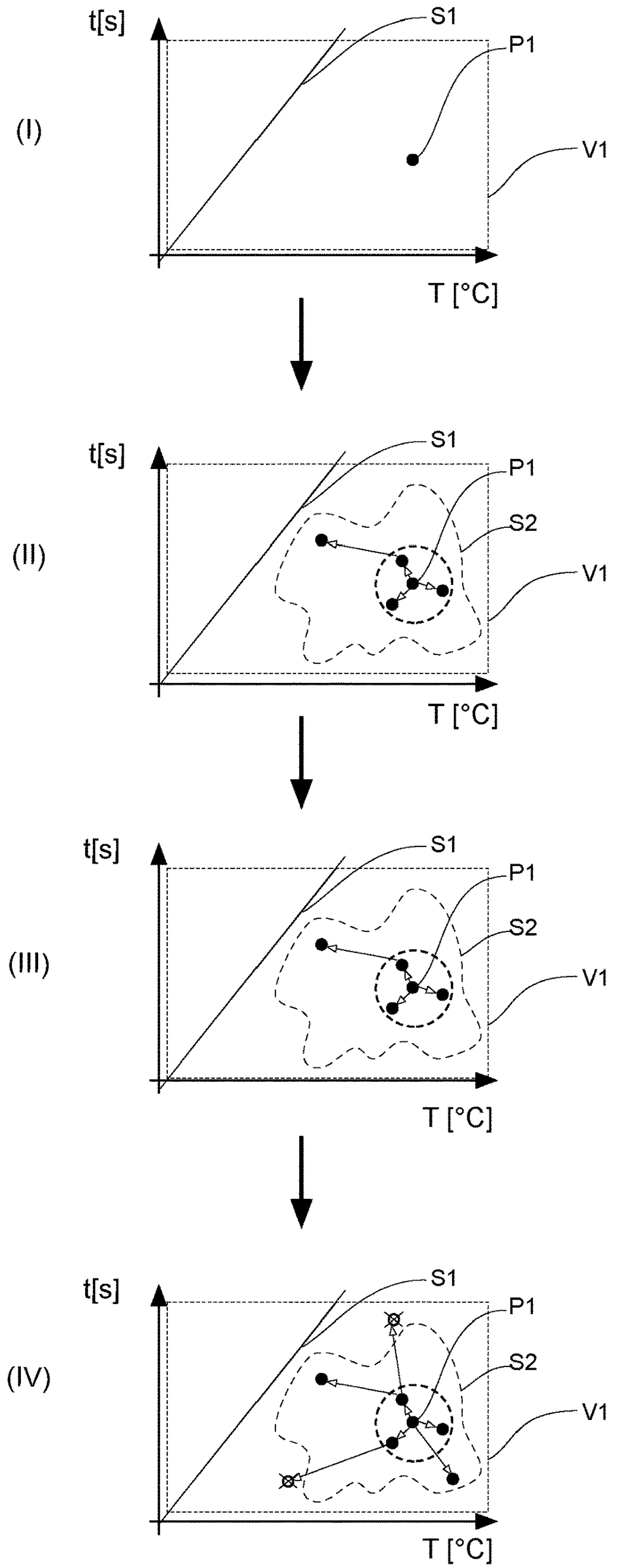
FIG. 2 shows test points in a test space.
Figure 3:
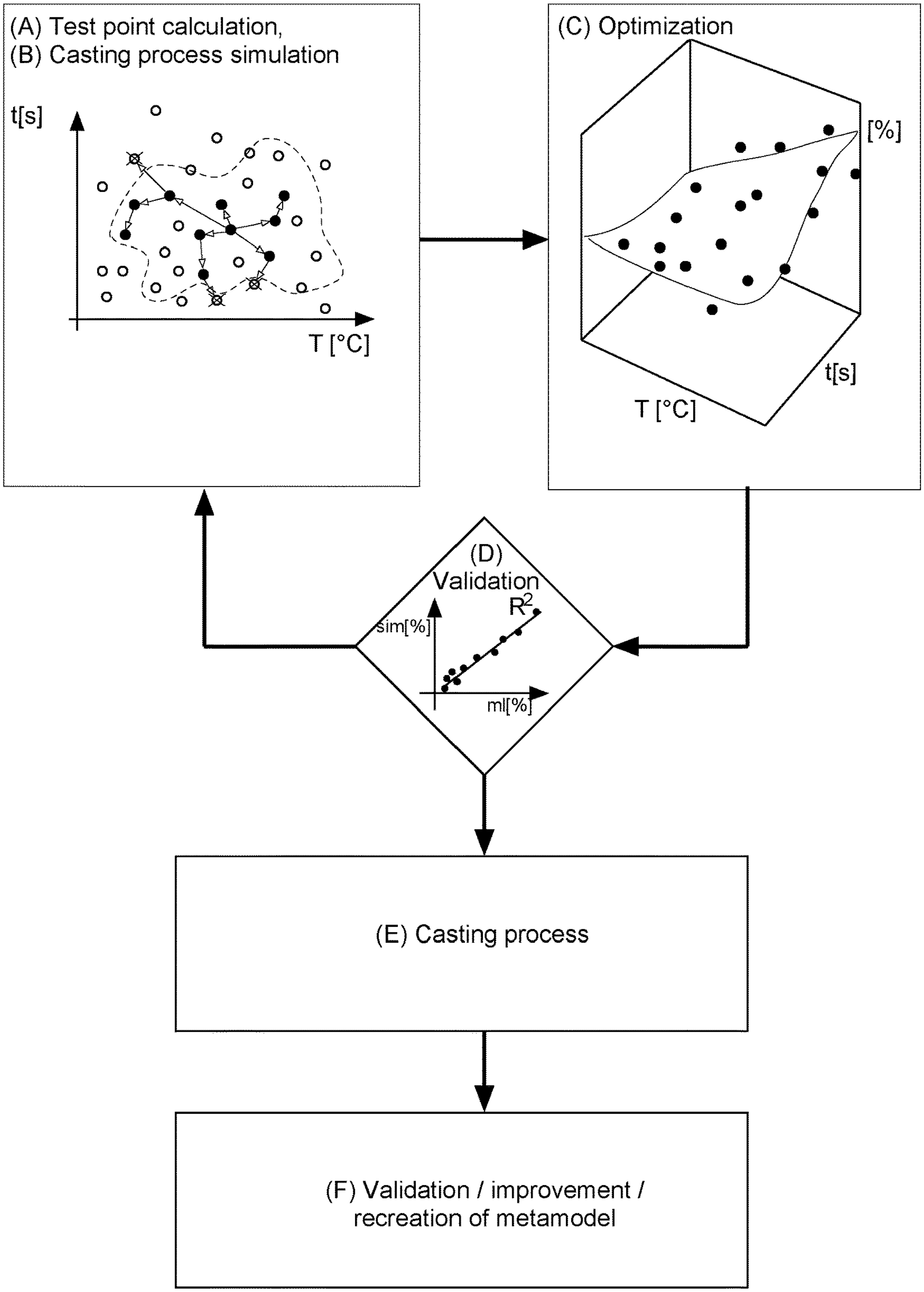
FIG. 3 shows a flow chart of a method according to the disclosure.

To simplify the following explanations, only test points for two input parameters are discussed in FIG. 2. However, it should be clear that the procedure described in FIG. 2 can be applied to multidimensional parameter sets.

FIG. 2 shows a schematic diagram (I) of a rectangular test chamber V1, with a melt temperature T being shown in ° Celsius on the abscissa and a mold opening time t in seconds on the ordinate.

In a casting process simulation, the entire test space shown in diagram (I) could in principle be simulated using test points, wherein for each test point, as already described at the beginning, a number of components could be manufactured virtually in sequence until the steady state for one or more temperatures of the casting mold is reached.

However, not all of the test points shown in diagram (I) can be moved at all in practice by means of the casting device 100, or in any case cannot be moved without damaging the casting device 100, the casting mold 120 or other components (input constraints and output constraints). The input constraints are represented schematically by a barrier S1, wherein all test points to the left of the barrier are not movable, while all test points to the right of the barrier are movable—taking into account the input constraints.

Furthermore, not every one of the test points shown enables the production of a cast component in the specified quality in practice (output constraints). The test space is therefore additionally restricted by output constraints, as shown schematically by the barrier S2. In FIG. 2, the diagram (II) shows the barrier S2 as a dashed line, wherein the test points located within this dashed line are test points that can be moved in reality and the test points located outside this line are test points that cannot be moved in reality.

The test points that can be moved in reality are therefore limited by various input constraints and output constraints. For example, a melt temperature that is too low leads to inadequate mold filling and faulty components. Furthermore, the cooling time must be shorter than the mold closing time in order to prevent damage to the casting device. Furthermore, the mold should not be opened before the melt has completely solidified. There are therefore a large number of limiting physical and mechanical boundary conditions that restrict the feasibility of certain test points.

These input constraints are taken into account in the test planning and before the first simulations are carried out in order to avoid time-consuming simulations being calculated for test points that cannot be represented in reality. The output constraints are not known in advance and are determined during the tests. The barrier S1 is therefore known before the simulation of the first test point, while the barrier S2 is determined dynamically during the filling of the test space.

A safe test point P1, which has proven to be a reliable or robust operating point for a casting device for a similar component, is preferably selected as the starting point for a first test point of a simulation.

Further test points are then simulated in the vicinity of this test point until linear regression is possible for the relevant output constraints, on the basis of which further test points can be planned and sequential space-filling test planning can be carried out.

Linear extrapolation can be used to estimate whether or not the test point can be represented in reality already before performing or simulating the test points, i.e. whether, for example, a machine stop or damage to the machine, mold or the like could occur during the execution of a real test using the parameters in question, or whether it is foreseeable that a good part cannot be produced with these parameters under any circumstances.

Diagrams (III) and (IV) show the step-by-step filling of the test space, wherein the test points marked with a cross represent the test points excluded from the test series and the test points filled in black represent test points that can be moved in reality.

In the following, a method is further described with reference to FIG. 3.

A method step (A) relates to the performance of a test point calculation, wherein process parameters of a casting process for a casting component are assigned to a respective test point, wherein a number of process parameters corresponds to a natural number n≥2 and defines an n-dimensional test space and wherein the test points are calculated sequentially filling the test space within the test space and are transferred to a casting process simulation.

A method step (B) relates to the performance of the casting process simulation, wherein the production of the casting component is simulated sequentially for the test points transferred from the test point calculation, starting from the first test point P1, using the process parameters assigned to the respective test point, wherein the sequential production of two or more casting components is simulated for each test point in a virtual casting mold until the temperature of the virtual casting mold has reached a steady state, and wherein an output parameter or a plurality of output parameters are evaluated for each casting component of a test point.

A method step (C) relates to the performance of an optimization, wherein at least one metamodel of the casting process simulation is created for at least part of the n-dimensional test space using the process parameters and the assigned output parameters, wherein a robust, steady optimum with its assigned process parameters is determined for one of the output parameters or for several of the output parameters.

The metamodel is a trained and validated AI model in the form of a neural network. Step (D) describes the validation of the AI model with the following steps: Determining a model quality of the AI model by comparing an output parameter of the casting process simulation for a validation test point with a prediction of the AI model for the output parameter of this validation test point, wherein the AI model is released, if a specified model quality is achieved or the validation is repeated for one or more further test points if the specified model quality is not achieved, wherein the output parameters of the casting process simulation for the validation test point are used to train the AI model before the new validation.

In step (E), a casting process is carried out by means of the casting device 100, wherein at least one casting component is produced by means of the casting device 100, wherein the process parameters assigned to the robust, steady optimum are used as process parameters of the casting device 100 and wherein an output parameter or a plurality of output parameters for the casting component is evaluated.

During the practical trials, sensor data from temperature sensors of the casting device 100 for measuring temperatures within the casting mold are collected to further train and validate the AI model 340 and to re-check the robustness of the relevant test point. The method step (F) describes that the sensor data from the sensors of the casting device is used to validate and/or improve and/or recreate the metamodel or metamodels.

In this way, the AI model 340 can be extended to a hybrid model based on both simulation data and real tests.

The AI model 340 can be used as part of a model-based control system for regulating the casting device 100, wherein target process points are specified using the AI model 340, the process parameters of which represent a robust optimum.

In particular, the AI model 340 enables a robust operating point to be reached quickly and autonomous process regulation.

What is claimed is:

1. A process design method for a casting device, comprising:

carrying out a test point calculation,
 wherein process parameters of a casting process for a target casting component are assigned to a respective test point,
 wherein a number of process parameters define an n-dimensional test space, and
 wherein the test points are calculated sequentially filling the test space within the test space and are transferred to a casting process simulation;

carrying out the casting process simulation,
 wherein production of simulated casting components corresponding to the target casting component is simulated sequentially for the test points transferred from the test point calculation using the process parameters assigned to the respective test point,
 wherein sequential production of two or more simulated casting components corresponding to the target casting component is simulated for each test point in a virtual mold until a temperature of the virtual mold has reached a steady state, and
 wherein an output parameter or a plurality of output parameters are evaluated for each simulated casting component of a test point;

carrying out an optimization,
 wherein at least one metamodel of the casting process simulation is created for at least part of the n-dimensional test space using the process parameters and assigned output parameters, and
 wherein a robust, steady optimum with its assigned process parameters is determined for one of the output parameters or for a plurality of the output parameters; and carrying out a casting process,
 wherein at least one real casting component corresponding to the target casting component is produced by a casting device, wherein the process parameters assigned to the robust, steady optimum are used as process parameters of the casting device, and
 wherein an evaluation of one output parameter or a plurality of output parameters for the at least one real casting component is carried out.

2. The method according to claim 1, wherein the test space is limited by one or more physical output constraints and/or one or more machine-specific output constraints and/or one or more component-specific output constraints, and the output constraints are determined based on the output parameters of the casting process simulation and/or the casting process.

3. The method according to claim 2, wherein an extrapolatable model is calculated for at least one output constraint, wherein compliance with the output constraint is checked for each test point before it is transferred to the casting process simulation by extrapolation based on the extrapolatable model, wherein, in case of compliance with the output constraint, the test point is transferred to the casting process simulation, and wherein, in case of non-compliance with the output constraint,
 the test point is discarded and a new test point is calculated using a distance criterion within the test space and this new test point is again checked for compliance with the output constraint,
 or the test point is discarded and a new test point is determined using the extrapolatable model on a boundary of the output constraint, or the test point is shifted using the extrapolatable model while maintaining a safety distance from the boundary of the output constraint.

4. The method according to claim 3, wherein a robust test point of a similar component is specified as a first test point, or wherein a central test point within the test space is selected as a first test point, the process parameters of which have a specified minimum distance to previously known input constraints.

5. The method according to claim 4, wherein starting from the first test point, test points are first defined within the test space that do not exceed a specified distance from the first test point until the extrapolatable model can be formed, which is recalculated based on a currently specified test point and nearest neighbors specific to the test point.

6. The method according to claim 3, wherein the extrapolatable model is a linear regression, or wherein the extrapolatable model is an AI model.

7. The method according to claim 3, wherein sensor data from sensors of the casting device are used to validate and/or improve and/or recreate at least one extrapolatable model.

8. The method according to claim 1, wherein test points in a vicinity of a possible robust, steady optimum are calculated by the test point calculation, and wherein the test points in the vicinity of the possible robust, steady optimum are evaluated using the metamodel in order to confirm the possible robust, steady optimum as the robust, steady optimum.

9. The method according to claim 8, wherein starting from the robust, steady optimum, further test points in the vicinity of the robust, steady optimum are run using the casting process.

10. The method according to claim 9, wherein the order of the test points is sorted starting from the robust optimum with increasing distance in the test space and/or sorted against a background of energy and/or time efficiency.

11. The method according to claim 8, wherein the robust optimum is validated before the casting process is carried out by the casting process simulation, and wherein test points in the vicinity of the robust, steady optimum are validated using the casting process simulation.

12. The method according to claim 1, wherein a metamodel is created for at least one casting defect, and/or wherein a metamodel is created for at least one machine parameter.

13. The method according to claim 12, wherein the metamodel is an AI model that is trained and validated based on the process parameters of the test points and the output parameters of the casting process simulation.

14. The method according to claim 13, wherein a validation of the AI model comprises determining a model quality of the AI model by comparing an output parameter of the casting process simulation for a validation test point with a prediction of the AI model for the output parameter of this validation test point, releasing the AI model if a specified model quality is achieved or repeating the validation for one or more further test points if the specified model quality is not achieved, and using the output parameters of the casting process simulation for the validation test point to train the AI model before renewed validation.

15. The method according to claim 1, wherein one or more process parameters are specified for each test point, which are selected from: melting temperature, pressure curve, pressure holding time, setting time, mold opening time, cooling parameters, on/off times.

16. The method according to claim 15, wherein for one or more of the process parameters, previously known input constraints limit the test space.

17. The method according to claim 1, wherein the test space is limited by one or more physical previously known input constraints and/or one or more machine-specific previously known input constraints and/or one or more component-specific previously known input constraints.

18. The method according to claim 1, wherein the test points are calculated sequentially filling the test space based on a distance criterion within the test space, wherein the distance criterion defines a distance of a next test point to be calculated from one or more previous test points within the test space.

19. The method according to claim 1, wherein an output parameter of the casting process simulation is a cast component defect of one of the simulated casting components corresponding to the target casting component, and/or wherein an output parameter of the casting process simulation is a machine parameter.

20. The method according to claim 1, wherein the steady state within the casting process simulation is considered to have been reached if a change in the temperature of the virtual mold for successive simulated casting components falls below a specified threshold value.

21. The method according to claim 1, wherein the optimization is a robust multi-objective optimization.

22. The method according to claim 1, wherein sensor data from sensors of the casting device are used to validate and/or improve and/or recreate the metamodel or metamodels.

23. A process design method for a casting device, comprising:

carrying out a test point calculation, wherein process parameters of a casting process for a target casting component are assigned to a respective test point, wherein a number of process parameters define an n-dimensional test space, and wherein the test points are calculated sequentially filling the test space within the test space and transferred to a casting process;

carrying out the casting process, wherein production of test casting components corresponding to the target casting component is carried out sequentially for the test points transferred from the test point calculation using the process parameters assigned to the respective test point, wherein sequential production of two or more test casting components corresponding to the target casting component is carried out for each test point in a mold of the casting device until a temperature of the mold has reached a steady state, and wherein an output parameter or a plurality of output parameters are evaluated for each of the test casting components of a test point;

carrying out an optimization, wherein at least one metamodel of the casting process is created for at least part of the n-dimensional test space using the process parameters and assigned output parameters, wherein a robust, steady optimum with its assigned process parameters is determined for one of the output parameters or for a plurality of the output parameters;

further carrying out the casting process, wherein at least one further casting component corresponding to the target casting component is produced by the casting device, wherein the process parameters assigned to the robust, steady optimum are used as process parameters of the casting device, and wherein an evaluation of one output parameter or a plurality of output parameters for the at least one further casting component is carried out.

24. A process design method for a casting device, comprising:

carrying out a test point calculation, wherein process parameters of a casting process for a target casting component are assigned to a respective test point, wherein a number of process parameters define an n-dimensional test space and wherein the test points are calculated sequentially filling the test space within the test space and are transferred to a simulated casting process and/or a casting process;

carrying out the simulated casting process and/or the casting process, wherein production of test casting components corresponding to the target casting component is simulated and/or carried out sequentially for the test points transferred by the test point calculation using the process parameters assigned to the respective test point, wherein sequential production of two or more test casting components corresponding to the target casting component is carried out for each test point in a virtual casting mold of the casting device and/or in a casting mold of the casting device until a temperature of the virtual casting mold and/or the casting mold has reached a steady state, wherein an output parameter or a plurality of output parameters are evaluated for each of the test casting components of a test point;

carrying out an optimization, wherein at least one metamodel is created for at least a part of the n-dimensional test space using the process parameters and assigned output parameters, wherein a robust, steady optimum with its assigned process parameters is determined for one of the output parameters or for a plurality of the output parameters; and further carrying out the casting process, wherein at least one further casting component corresponding to the target casting component is produced by a casting device, wherein the process parameters assigned to the robust, steady optimum are used as process parameters of the casting device, and wherein an evaluation of one output parameter or a plurality of output parameters for the at least one further casting component is carried out.

* * * * *